United States Patent [19]

Ko et al.

[11] Patent Number: 5,218,449
[45] Date of Patent: Jun. 8, 1993

[54] NERVOUS CLOCK SIGNAL GENERATOR FOR VIDEO RECORDER

[75] Inventors: Jung W. Ko, Lawrenceville; Alvin R. Balaban, Lebanon; Christopher H. Strolle, Lawrenceville, all of N.J.

[73] Assignee: SamSung Electronics Co., Ltd., Suwon, Rep. of Korea

[21] Appl. No.: 861,580

[22] Filed: Apr. 1, 1992

Related U.S. Application Data

[63] Continuation of Ser. No. 839,542, Feb. 24, 1992.

[51] Int. Cl.$^5$ .............................................. H04N 5/76
[52] U.S. Cl. ..................................... 358/330; 358/310; 358/319; 358/320; 358/337; 358/339; 358/153; 358/17; 358/335
[58] Field of Search .............. 358/310, 319, 320, 326, 358/330, 335, 337, 339, 17, 153, 158; 360/36.1, 36.2

[56] References Cited

U.S. PATENT DOCUMENTS

| | | | |
|---|---|---|---|
| 3,820,154 | 6/1974 | Faroudja et al. | 358/326 |
| 4,323,915 | 4/1982 | Cezar et al. | 358/330 |
| 4,994,922 | 2/1991 | Goddard | 358/310 |
| 5,113,262 | 5/1992 | Strolle et al. | 358/310 |
| 5,126,854 | 6/1992 | Sano | 358/319 |

Primary Examiner—Tommy P. Chin
Assistant Examiner—Khoi Truong
Attorney, Agent, or Firm—Robert E. Bushnell

[57] ABSTRACT

A video recorder for recording composite video signals includes an analog to digital converter for digitizing samples of the composite video signal being recorded. A sync separator separates horizontal synchronizing information from the composite video signal being recorded. Filtering separates the chrominance information portion of the composite video signal being recorded, and a down-converter mixes that separated chrominance information with a nervous carrier signal thereby to generate a color-under signal. A controlled oscillator generates a succession of pixel clock signals at a rate the frequency and phase of which are determined in accordance with an oscillator control signal, the rate being more than twice the frequency of the nervous carrier signal and setting the rate of the sampling by the analog to digital converter. A counter counts the number of pixel clock signals supplied by the controlled oscillator, and a frequency divider divides the count by a prescribed factor. A discriminator determines when the resulting submultiple of the count differs in frequency or phase from the horizontal synchronization separated from the composite video signal being recorded, to develop an error signal that is low-pass filtered to generate the oscillator control signal. This completes a phase-lock loop connection including the controlled oscillator, the counter, the frequency divider, the discriminator and the low-pass filter, which loop governs sampling during the analog to digital conversion of the composite video signal being recorded. The nervous carrier signal is derived from this same phase-lock loop.

12 Claims, 8 Drawing Sheets

NERVOUS CLOCK SIGNAL GENERATOR FOR VIDEO RECORDER

This is a continuation of U.S. patent application Ser. No. 07/839,542 filed Feb. 24, 1992.

The invention relates to video recording/playback systems and, more particularly, to generating the nervous carrier signal used during recording to down-convert to color-under signal the chroma separated from a composite video signal and during playback to up-convert color-under signal to chroma for inclusion in a regenerated composite video signal.

BACKGROUND OF THE INVENTION

Recently, along with the development of digital processing techniques for video signals, household VCRs have come into the market that are designed to provide higher resolution and better quality images. The specification and drawing of U.S. Pat. No. 5,113,262 issued May 12, 1992 to C. H. Strolle et alii and entitled VIDEO SIGNAL RECORDING SYSTEM ENABLING LIMITED BANDWIDTH RECORDING AND PLAYBACK are incorporated herein by reference. This system was developed to provide a higher-resolution home VCR that is at the same time compatible with the standard VHS system.

The video signal recording system that is described in U.S. patent application Ser. No. 5,113,262 digitizes composite video signal and subjects it to adaptive digital spatio-temporal filtering to separate a digitized luminance signal substantially free of chrominance information. This digitized luminance signal is supplied as input signal to a digital band-separation filter that generates a digital low-pass filter response to the digitized luminance signal and a digital high-pass filter response to the digitized luminance signal, which responses exhibit a crossover at a mid-frequency. The digital high-pass filter response is adaptively de-emphasized relative to the digital low-pass filter response and is then folded around the mid-frequency to appear as a reverse spectrum occupying the same portion of the baseband as the normal-spectrum digital low-pass filter response. The resulting reduced-bandwidth luminance signal with accompanying horizontal and vertical synchronizing signals is then used to frequency modulate a luminance carrier frequency, to generate a luma portion of the signal recorded on the video tape in a manner substantially in accordance with the standard VHS system procedure.

The playback circuitry for a video signal recording and playback system that is described in U.S. Pat. No. 5,113,262 includes a time-base corrector (TBC) that corrects during playback for the time-base error (TBE) in the reduced-bandwidth luminance signal recovered in analog form from the video tape by standard methods and subsequently digitized. A TBC is a device in which time-base error included in a video signal is eliminated by a memory which functions as a time-base buffer. The video signal with the TBE is written into the memory in accordance with a clock signal synchronized with the video signal with the TBE and is read out in accordance with a stable clock signal. The term "TBE" denotes the jitter introduced into a signal by the mechanical factors in a VCR recording and playback system, such as speed variations of the tape transport during recording and during playback, tape vibration, etc.

The time-base-corrected reduced-bandwidth luminance signal is unfolded, and the unfolded signal subjected to adaptive digital spatio-temporal filtering to separate a full-spectrum digitized luminance signal substantially free of folding artifacts. The high-frequency portion of the separated digitized luminance signal substantially free of folding artifacts is then re-emphasized.

The video signal recording system that is described in U.S. patent Ser. No. 5,113,262 follows in some respect the standard VHS system procedure for recording and playing chroma information in the color-under format. The standard VHS system procedure for playing back chroma information recorded in the color-under format includes measures as described in the next paragraph, which measures prevent time-base error (TBE) in the video signals from introducing color errors. For example, TBE occurs in the composite video signals to be recorded when they are supplied from another video recorder owing to speed variations of the tape transport used for playback, to tape vibration, etc. During recording, further TBE arises owing to speed variations of the tape transport used for recording, to tape vibration, etc. During subsequent playback, still further TBE arises owing to speed variations of the tape transport used for playback, to tape vibration, etc.

During recording, separated chrominance sidebands with a suppressed 3.58 MHz carrier are heterodyned with 4.21 MHz oscillations to generate complex amplitude-modulation sidebands of a 629 kHz suppressed carrier. Intervening color bursts are heterodyned down to 629 kHz during this down-conversion procedure for generating a color-under signal. The 4.21 MHz oscillations used in the down-conversion are a so-called "nervous carrier signal" supplied from a phase-locked oscillator (PLO). This PLO includes a voltage-controlled oscillator (VCO), the frequency and phase of which VCO are electrically controlled by an error signal and are synchronized to a multiple of the scan line frequency. To achieve such synchronization, the VCO is included in a corrective-feedback loop connection in which the VCO supplies its oscillations to a frequency-divider, the frequency-divider supplies a submultiple of the oscillations to the frequency and phase comparator, the frequency and phase comparator supplies its comparison results to a loop filter that determines the speed with which the error signal can be diminished by the loop connection, and the filter response is applied to the VCO for regulating the frequency and phase of its oscillations, thereby to complete the corrective-feedback loop that adjusts the frequency and phase of the oscillations from the VCO so as to diminish the error signal. If the filter response time constant is not appreciably longer than a scan line duration, the frequency and the phase of the 4.21 MHz oscillations vary in accordance with the TBE in the horizontal synchronization. In the down-conversion to 629 kHz the TBE in the chroma differentially combines with the TBE in the 4.21 MHz oscillations, so that the color-under carrier is essentially free of TBE. During playback, in an up-conversion procedure, stable 4.21 MHz oscillations are heterodyned with the color-under signal to regenerate color burst and chroma sidebands, the 3.58 MHz carrier of which is essentially free of TBE.

Of interest to the invention is the need to generate the clocking signal that is used to time the sampling of the composite video signal by an analog-to-digital converter when digitizing the composite video signal and that is subsequently used to clock the resulting digital samples into time-base corrector memory. As noted previously, TBE occurs in the composite video signals to be recorded when they are supplied from another video recorder owing to speed variations of the tape transport used for playback, to tape vibration, etc. To track any such TBE by varying the instants of sampling the horizontal scan lines picture-element-by-picture-element with the analog-to-digital converter, during digitization of the composite video signal supplied for recording, the clocking signals for the analog-to-digital converter are supplied from a phase-locked oscillator (PLO) locked to horizontal sync pulses separated from the composite video signal being digitized. This PLO includes a voltage-controlled oscillator (VCO), the frequency and phase of which VCO are electrically controlled by an error signal and are synchronized to a multiple of the scan line frequency. (The VCO may in fact be a current-controlled oscillator instead, as will be appreciated by those familiar with PLO design.)

The oscillations of this VCO are locked in frequency to the synchronizing pulses, just like the nervous carrier used in the procedures to convert chrominance signals extracted from composite video signals to color-under signals and to convert back to chrominance signals form color-under signals. By analogy, then, clocking signals generated from the oscillations of this VCO for timing digital video processing are referred to as "nervous cocking signals" or "nervous clock signals".

To achieve synchronization to a multiple of the scan line frequency, the VCO is included in a corrective-feedback loop connection in which the VCO supplies its oscillations to a frequency-divider, the frequency-divider supplies a submultiple of the oscillations to the frequency and phase comparator, the frequency and phase comparator supplies its comparison results to a loop filter that determines the speed with which the error signal can be diminished by the loop connection, and the filter response is applied to the VCO for regulating the frequency and phase of its oscillations, thereby to complete the corrective-feedback loop that adjusts the frequency and phase of the oscillations from the VCO so as to diminish the error signal. If the filter response time constant is not appreciably longer than a scan line duration, the frequency and the phase of the nervous clocking signal supplied from the VCO to the analog-to-digital converter vary in accordance with the TBE in the horizontal synchronization. The TBE in the horizontal synchronization is an index of the TBE in the luminance signal, so the TBE in the luminance signal is compensated for when the time-base-corrector memory is read from in accordance with a stable clock.

In accordance with the invention, the 4.21 MHz sinusoidal signals used in the down-converting and up-converting procedures associated with color-under signals are not generated directly using a phase-locked analog oscillator oscillating at a 4.21 Mhz frequency. Instead, the 4.21 Mhz frequency nervous carrier signals are derived from the higher-frequency oscillations supplied as nervous clock signals to the analog-to-digital converter used for digitizing luminance signals. This derivation can be done using a sine-wave look-up table stored in read-only memory (ROM) or by heterodyning a stable oscillator with the higher-frequency oscillations or a submultiple of those oscillations as obtained by frequency division.

SUMMARY OF THE INVENTION

An embodiment of the invention is in a video recorder for recording composite video signals which includes an analog to digital converter for digitizing samples of the composite video signal being recorded. A sync separator separates horizontal synchronizing information from the composite video signal being recorded. Filtering separates the chrominance information portion of the composite video signal being recorded, and a down-converter mixes that separated chrominance information with a nervous carrier signal thereby to generate a color-under signal. A controlled oscillator generates a succession of pixel clock signals at a rate the frequency and phase of which are determined in accordance with an oscillator control signal, the rate being more than twice the frequency of the nervous carrier signal and setting the rate of the sampling by the analog to digital converter. A counter counts the number of pixel clock signals supplied by the controlled oscillator and includes means for returning its count to an initial value after counting the number of pixels occurring in four scan lines. A frequency divider divides the count by a prescribed factor to generate a submultiple thereof. A discriminator determines when the submultiple of the count from said counter differs in frequency or phase from the horizontal synchronizing information separated from the composite video signal being recorded, to develop an error signal. A low-pass filter responds to the error signal for generating the oscillator control signal. This completes a phase-lock loop connection including the controlled oscillator, the counter, the frequency divider, the discriminator and the low-pass filter; and the nervous carrier signal is derived responsive to the condition of the counter. This derivation can be done using a sine-wave look-up table stored in read-only memory (ROM) or by heterodyning a stable oscillator with the higher-frequency oscillations or a submultiple of those oscillations as obtained by frequency division.

DETAILED DESCRIPTION OF THE INVENTION

Figure 1:
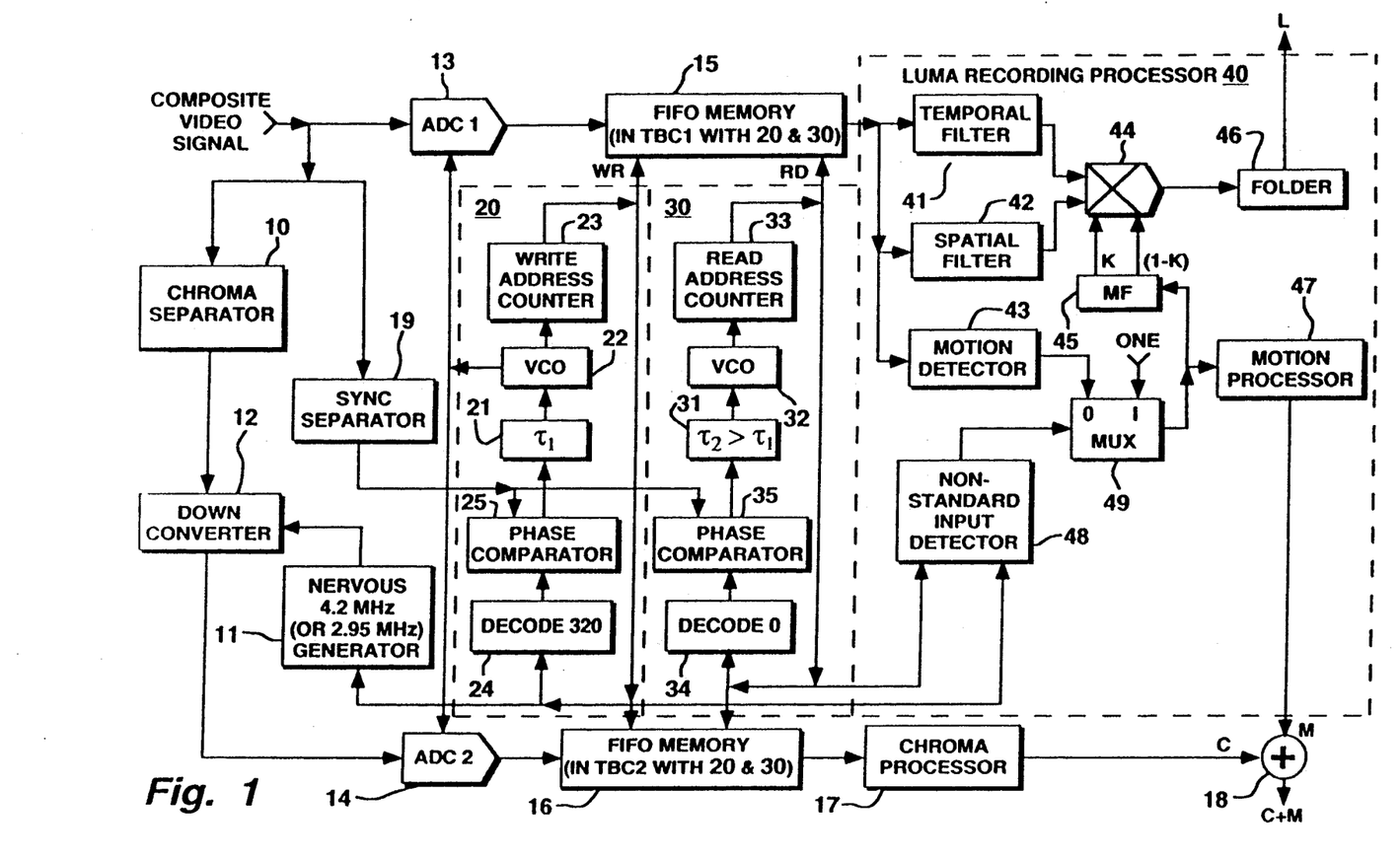
FIG. 1 is a schematic diagram of video recording circuitry embodying aspects of the invention.

Referring to FIG. 1, the recording circuit for a video recording/playback system embodying the invention comprises a chroma separator 10 connected for separating chroma from a composite video signal, a generator 11 of nervous 4.21 MHz sinusoidal carrier signal, a down-converting mixer 12 for generating a color-under signal responsive to separated chroma and the nervous 4.21 MHz sinusoidal carrier signal, a first analog-to-digital converter (ADC1) 13 for the composite video signal, a second analog-to-digital converter 14 (ADC2) for the color-under signal, a first first-in(first-out (FIFO) memory 15 for the digitized composite video signal, a second first-in/first-out (FIFO) memory 16 for the digitized color-under signal, a chroma recording processor 17, a digital adder 18 used for combining chroma and motion sidebands, and a sync separator 19 for separating both horizontal and vertical synchronizing pulses from the composite video signal. A first time-base corrector (TBC1) is formed from the first-in/first-out memory 15 in combination with a write-address generator 20 and a read-address generator 30. A second time-base corrector (TBC2) is formed from the first-in/first-out memory 16 in combination with the write-address generator 20 and the read-address generator 30. In addition, the recording circuit further comprises a luma recording process 40, which in accordance with the invention includes a non-standard input detector 48 and a multiplexer 49 for modifying the connections in the luma recording processor 40 when a composite video signal with excessive TBE is received for recording.

The write-address generator 20 is a first phase-locked loop (PLL1) that includes elements 21-25. The low-pass filter 21 establishes a loop time constant $\tau_1$ for a PLL1 error signal, which loop time constant $\tau_1$ is little longer than the duration of a horizontal scan line. The voltage-controlled oscillator 22 oscillates at or near a frequency that is a high multiple (e.g., 640) times horizontal scan line frequency as controlled by the PLL1 error signal filtered by the low-pass filter 21. The oscillations from the VCO 22 control the timing of the sampling performed by the analog-to-digital converters 13 and 14. The write address counter 23 is connected for counting each cycle of the oscillations from the oscillator 22. The three-hundred-twenty count of the write address counter 23 is decoded by the decoder 24 to be supplied as a first input signal to the frequency and phase comparator 25. As well known by those skilled in the art of phase-locked loop design, the counting of oscillations from a VCO and decoding a selected count or selected group of adjacent counts provides for dividing the frequency of the oscillations, in the generation of a feedback signal to be compared to a reference signal for generating an error signal that controls the frequency and phase of the VCO. The second input signal to the comparator 25 comprises separated synchronizing pulses. The comparator 25 is of one of the known types that generates output signal proportional to the differential delay between corresponding edges of its first and second input signals. The comparator 25 supplies its output signal to the low-pass loop filter 21, closing the phase-locked loop PLL1. Since the loop filter 21 has a time constant little longer than the duration of one horizontal scan line, the phase-locked loop PLL1 response is to horizontal separated sync pulses, rather than vertical ones, and is fast enough to follow the time-base error of the input signal quite precisely.

The read-address generator 30 is a second phase-locked loop (PLL2) that includes elements 31-35. The low-pass filter 31 establishes a loop time constant $\tau_2$ for a PLL2 error signal, which time constant $\tau_2$ is about twenty times as long as the duration of a horizontal scan line. The voltage-controlled oscillator 32 oscillates at or near a frequency that is the high multiple (e.g., 640) times horizontal scan line frequency, as controlled by the PLL2 error signal filtered by the low-pass filter 31. The read address counter 33 is connected for counting each cycle of the oscillations from the oscillator 32. The zero count of the write address counter 33 is decoded by the decoder 34 to be supplied as a first input signal to the frequency and phase comparator 35. The second input signal to the comparator 35 comprises separated synchronizing pulses. The comparator 35 is of the same type as the comparator 25 and supplies its output signal to the low-pass loop filter 31, closing the phase-locked loop PLL2. The loop filter 31 time constant being about twenty times as long as the duration of a horizontal scan line allows the second phase-locked loop (PLL2) to be synchronized with the vertical sync signal of the input signal and not to track the quick change of the input signal.

Accordingly, the write-address counter 23 quickly follows timing variations of the composite video input signal and, simultaneously, generates a write-address signal WR which the write-address generator 20 supplies both to the first FIFO memory 15 for digitized composite video signal and to the second FIFO memory 16 for digitized color-under signal. Since read-address counter 33 is synchronized with the timing of the composite video input signal averaged over a long period and is unaffected by tape jitter and the like, counter 33 generates a relatively stable read-address signal RD for the FIFO memory 15 of the time-base corrector TBC1 and for the FIFO memory 16 of the time-base corrector TBC2.

The FIFO memories 15 and 16 are each presumed to be able to store a full scan line of pixels. An offset between the write address supplied to FIFO memories 15 and 16 and the read address supplied to FIFO memories 15 and 16 is necessary in order for the memories to provide their temporary storage functions, without risk of being overwritten before being read. This offset is simply provided for by arranging the decoders 24 and 34 to generate output ONEs a half-scan-line apart.

The elimination of the time-base error TBE1 in the high-frequency component of the composite video signal by the time-base corrector TBC1 formed by FIFO memory 15 and address generators 20 and 30 facilitates spatial processing of the luma signal in the luma recording processor 40. The luma recording process 40 includes an adaptive luma signal separator comprising a temporal filter 41, a spatial filter 42, a motion signal detector 43, a soft switch 44, and a motion factor generator 45. The temporal filter 41 is described in U.S. Pat. No. 5,113,262 as being a comb filter including comb filtering of the type known as "frame comb" filtering, which is suited to filtering static rather than moving portions of successive television images. The spatial filter 42 is there described as being a comb filter including comb filtering of the type known as "line comb" filtering, which is suited to filtering moving rather than static portions of successive television images. The motion factor generator 45 generates motion factors K and (1−K) recorded in a read-only memory (ROM) lookup table as addressed by values of the detected motion signal. The soft switch 44 determines the output ratios of temporal filter 41 and spatial filter 42 in response to the supplied motion factors K and (1−K). This adaptive luma signal separator, more particularly described in U.S. Pat. No. 5,113,262 is followed by a spectrum folder 46, preferably of an adaptive type, such as particularly described in U.S. Pat. No. 5,113,262. A motion processor 47 modulates the motion signal from the motion signal detector 43 onto a four-phase carrier to generate a signal M consisting of sidebands that fall in the Fukinuki hole which interleaves with color-under signal C. The signals C and M are supplied as summand input signals to the adder 18.

Only those portions of the luma recording processor 40 modified to perform the present invention will be described in detail below. A difference in the structure of the invention and the structure described in allowed U.S. Pat. No. 5,113,262 is that, responsive to the composite video signal being classified as a non-standard input signal by the non-standard input detector 48, the multiplexer 49 selects arithmetic one, rather than the motion signal ranging from arithmetic zero for no motion to arithmetic one for full motion as generated by the motion detector 43, for application to the motion factor generator 45 and to the motion processor 47. This forces the output values K and (1−K) from the motion factor generator 45 to condition the luma signal L to consist entirely of spatially extracted luma samples, in the case of a non-standard input signal, without regard to the presence or absence of the motion signal. In other words, when a non-standard input signal is detected, the time-base-corrected digitized signal from the FIFO memory 15 is processed primarily in the spatial domain to generate the luma signal L supplied as output signal from the luma recording processor 40.

The non-standard input detector 48 generates a control signal that is either a ONE or a ZERO depending on whether or not the input signal is a non-standard signal including TBE. The non-standard input detector 48 shown in FIG. 1 is assumed to be of a type that senses jitter by determining the difference between the write address WR from the write-address counter 23 and the read address RD from the read-address counter 33 and then determining whether or not the presently input video signal is a non-standard signal. A particular embodiment of this type of non-standard input detector is described in detail further on in this specification, with reference to FIG. 4 of the drawing. The non-standard signal detector 48 is not limited to this particular type; all that is required in the construction of the non-standard signal detector is that it can detect whether or not the presently input signal is a non-standard signal including TBE.

The remaining portions of the recording electronics are not shown in FIG. 1, but are similar to those described in U.S. App. Ser.No. 07/569 029 now U.S. Pat. No. 5,116,262. The luma signal L is converted from digital to analog form and used to frequency-modulate an FM carrier wave. The C+M output signal from the adder 18 is converted from digital to analog form and added to the FM carrier wave. The resulting sum signal is then recorded on a magnetic recording medium using helical scan techniques.

In the chroma signal recording circuitry of the invention, the down-converter 12 receives the nervous 4.21 MHz output signal of generator 11, such that during the down-conversion of the chroma signal, TBE appears in the resulting color-under signal. The TBE introduced into the resulting color-under signal corresponds to the TBE in the nervous sampling clock supplied from the VCO 22 to analog-to-digital converter 14. The digital samples supplied from the analog-to-digital converter 14, if they were re-timed in accordance with a stable clock to occur regularly, would thus be free of TBE with respect to color-under carrier frequency. Accordingly, during playback up-conversion with a stable clock can regenerate chroma signals without appreciable error in color subcarrier phasing. This is similar to prior art practice, except for the nervous 4.21 MHz frequency carrier signals being generated in a different way. In prior-art practice there is no time-base correction of the luminance signal during recording, as can give rise to differential TBE as between luma and chroma signals that will cause a luma/chroma tracking problem during playback. There is no need for time-base correction of the luminance signal, since the luminance signal is not digitized and then digitally filtered during the recording procedure. In prior-art practice the procedure followed during playback, then, is simply to up-convert the color-under signal by mixing it with a stable 4.21 MHz sine wave supplied from a crystal oscillator, thereby to regenerate the chroma sidebands for a composite video signal supplied to a VHF-television-channel modulator. Since the 4.21 MHz sine wave and the carrier of the color-under signal are both free from TBE, the regenerated 3.58 MHz subcarrier as occurs during color burst is free from TBE, which facilitates synchronization of the local color oscillator in a color television receiver. The pull-in range of the AFPC loop of the local color oscillator is much less likely ever to be exceeded.

In video tape recorders in which the luminance signal is digitized and then digitally filtered during the recording procedure, particularly when the digital filtering is in the transversal direction, which are the type of recorders which the invention concerns, time-base correction of the luminance signal is needed in order that the digital filtering can proceed. The generation of the color-under signal by down-converting 3.58 MHz frequency chroma using a 4.21 MHz nervous carrier signal is done in order to correct for TBE in regard to the color-under carrier frequency. The TBE in regard to the modulating function of the color-under signal is not corrected for by this procedure, however. Because the luminance signal is time-base corrected and the modulating function of the color-under signal is not, there is a resultant differential time-base error between the luminance information in the L signal and the chrominance information in the digitized color-under signal supplied by the analog-to-digital converter 14. This is an impediment to luma/chroma tracking on screen during the playback of recorded video.

Figure 6:
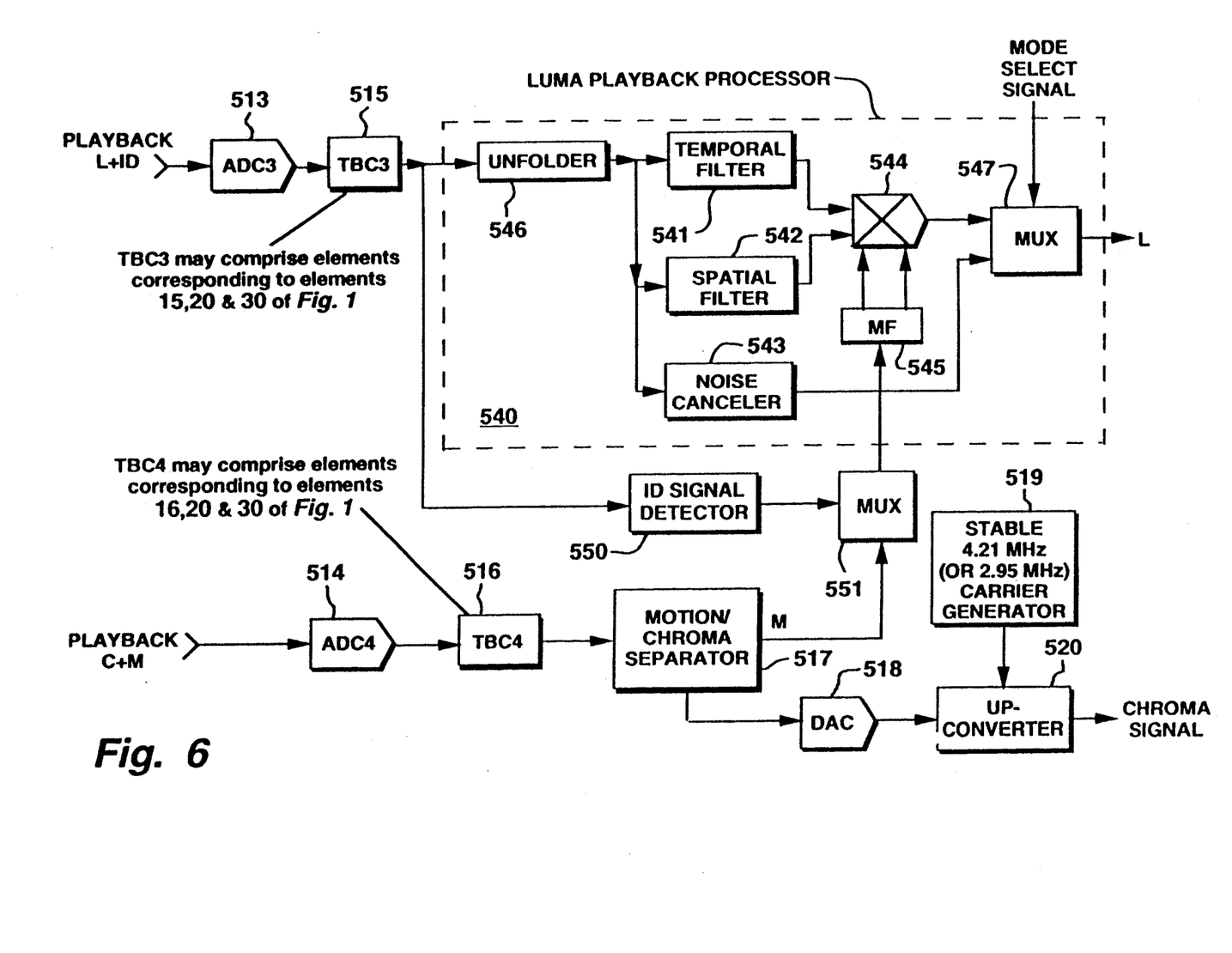
FIG. 6 is a schematic diagram of playback circuitry for use with the FIG. 1 video recording circuitry modified per FIG. 2, which playback circuitry embodies the invention in another of its aspects.

This impediment to luma/chroma tracking is removed by applying a time-base correction to the digitized color-under signal supplied by the ADC 14 which corresponds to the time-base correction applied to the digitized luminance signal supplied by the ADC 13. The time-base correction of the digitized color-under signal is done by the FIFO memory 16, which receives the read addresses of the FIFO memory 15 as its write addresses and receives the write addresses of the FIFO memory 15 as its read addresses. The adverse effect that the time-base corrector TBC2 comprising elements 16, 20 and 30 tends to have on the synchronization of the local color oscillator in the color television receiver the video tape recording is played back for is compensated for in the playback electronics, as will be explained in detail further on in this specification when FIG. 6 is described in detail.

The time-base-corrected digitized color-under signal chroma is supplied from the FIFO memory 16 to the chroma recording processor 17. The chroma recording processor 17 limits the image response to input chroma signal, performs anti-crosstalk filtering to prevent crosstalk into the Fukinuki hole, which the motion signal M supplied from motion processor 47 is to occupy, and then supplies the final chroma signal C as one input signal of adder 18.

Figure 2:
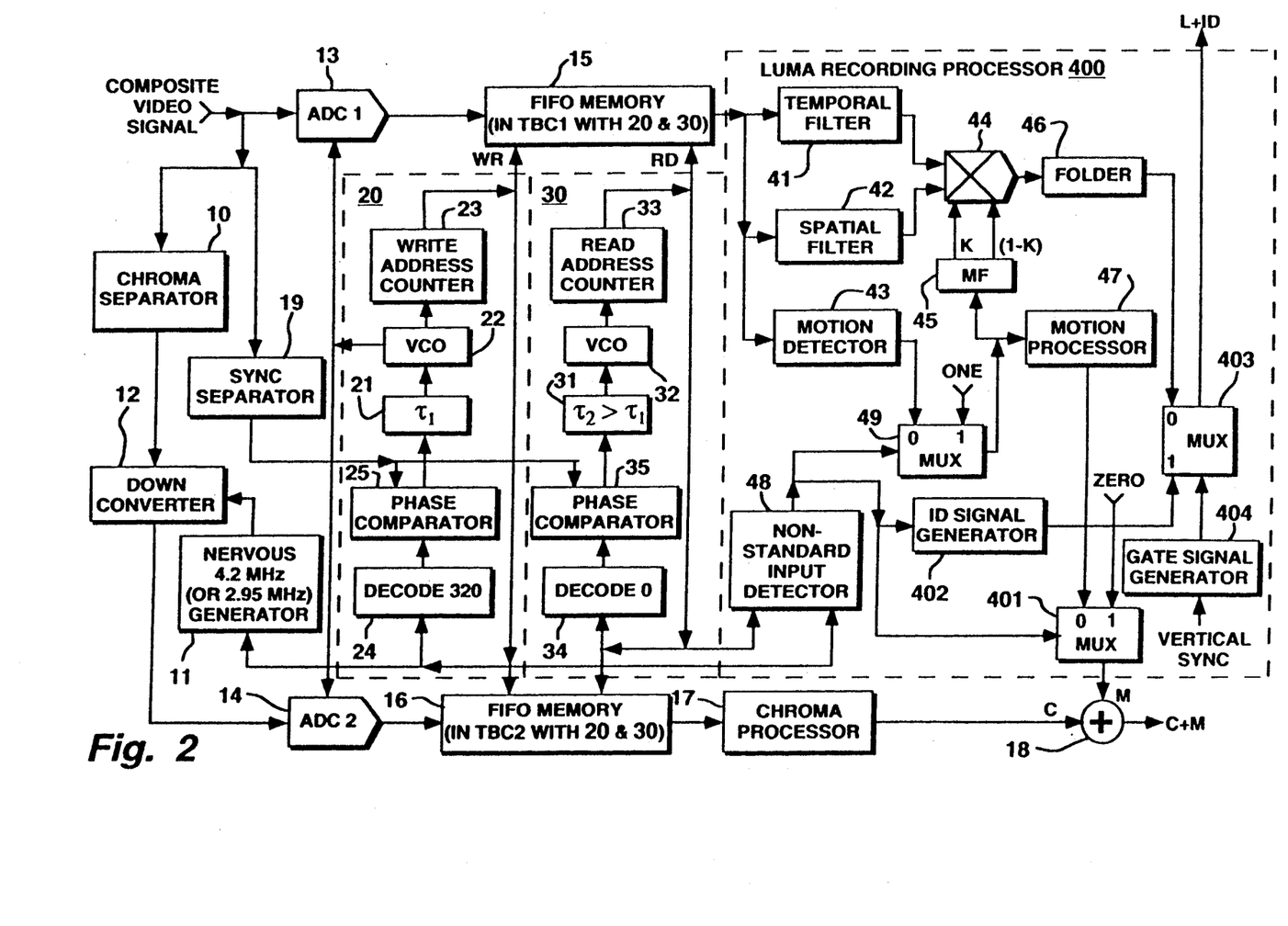
FIG. 2 is a schematic diagram of a modification that can be made to the FIG. 1 video recording circuitry to improve its performance in accordance with a further aspect of the invention.

FIG. 2 shows a modified luma recording processor 400 that can replace the luma recording processor 40 of the FIG. 1 recording circuitry, which includes in addition to the elements 41–49 of processor 40 further elements 401–404. The luma recording processor 400 responds to an input signal supplied for recording being classified as non-standard to set to zero the motion signal M supplied to the adder 18. This procedure is preferable to setting the motion signal M supplied to the adder 18 to full value in response to the input signal being classified as non-standard, as done in the FIG. 1 recording circuitry. This procedure is preferably because the motion signal M when full-valued tends to exhibit some undesired crosstalk into the color-under signal C. However, this procedure necessitates that some alternative way be provided for signaling the video tape playback circuitry that the recorded video signal is a non-standard one requiring its processing be carried out only in the two-dimensional spatial domain and not on a filed-to-field or frame-to-frame basis in the time domain.

The multiplexer 401 is used to apply selectively the motion signal M from the motion processor 47 to the adder 18 when the non-standard input signal detector 48 classifies the video input signal received for recording to be standard, or substantially TBE-free, and supplies a logic ZERO to the multiplexer 401. When the non-standard input signal detector 48 classifies the video input signal received for recording to be non-standard and supplies a logic ONE to the multiplexer 401, the multiplexer 401 selectively applies arithmetic zero to the adder 18, rather than the motion signal M from the motion processor 47.

The ID signal generator 402 is of a type that generates an ID code capable of identifying the input signal as a non-standard signal by any known method, in response to the output signal from the non-standard input detector 48 being a ONE. For example, the ID code may be a succession of pseudo-noise pulse sequences when a non-standard video signal is to be recorded and black level or a different succession of pseudo-noise pulse sequences when a standard video signal is to be recorded. The multiplexer 403 receives the output signals of the folder 46 and the ID signal generator 402 as input signals and responds to the condition of a control signal supplied thereto from the gate signal generator 404 to select one of these input signals as the model on which to base its output signal. The gate signal generator 404 responds to a vertical sync signal to generate a gate signal that is applied to the multiplexer 403 as its control signal conditioning the multiplexer 403 to select its ID code input signal as the model on which to base its output signal during the active portion of a prescribed scan line during or immediately following the vertical blanking period. The multiplexer 403 supplies a time-multiplexed luma and ID signal L+ID to the remainder of the recording circuitry, which is conventional in nature.

Figure 3:
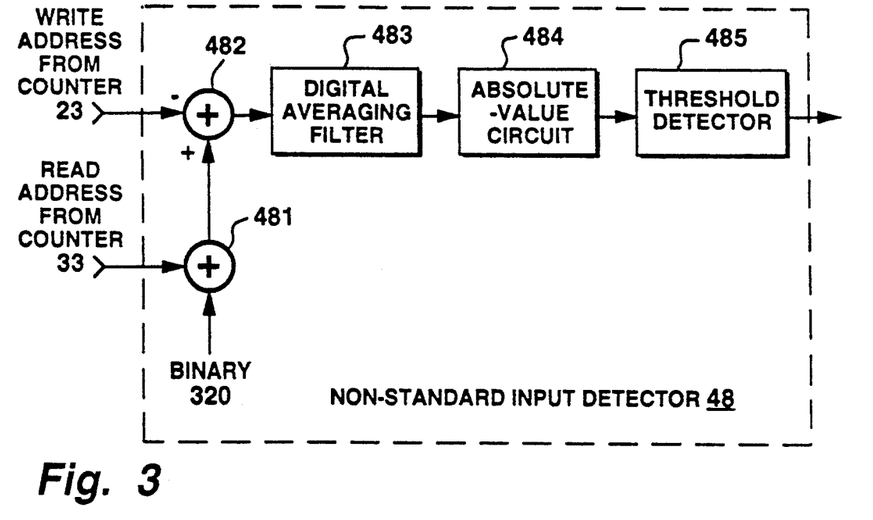
FIG. 3 is a schematic diagram of a non-standard input detector for determining whether video signals supplied for recording have too much time-base error to be adaptively spatiotemporally filtered as a step in the recording procedure, which detector is used as an element in the FIG. 1 and FIG. 2 video recording circuitry.

FIG. 3 shows in greater detail a possible structure for the non-standard input signal detector 48. A digital adder 481 adds binary 320 (half the 640 pixels in a scan line) to the read address supplied from counter 33 to generate a signal that in the absence of TBE should equal the write address supplied from counter 33 and that is differentially combined with the write address supplied from counter 33, using a digital subtractor 482. The subtractor 482 supplies its difference signal to a digital averaging filter 483 that averages over many samples. In its output signal an absolute value circuit 484 rectifies that average, which is applied as its input signal. The output signal of the absolute value circuit 484 is supplied to a threshold detector 485, which typically consists of a digital comparator. The threshold detector 485 generates a logic ONE output when a prescribed value is exceeded by the output signal of the absolute value circuit 484, which ONE indicates that the video input signal received for recording is classified as being non-standard. If the output signal of the absolute value circuit 484 does not exceed the prescribed value, the threshold detector 485 generates a logic ZERO output, which ZERO indicates that the video input signal received for recording is classified as being standard.

Figure 4:
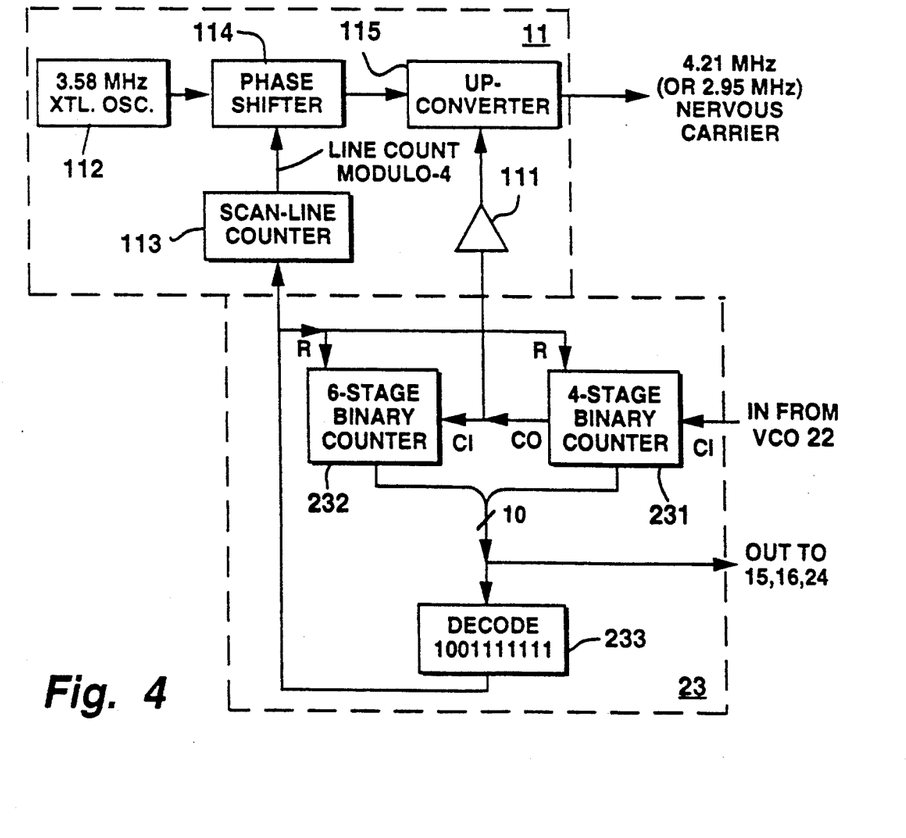
FIGS. 4 and 5 are each a schematic diagram of an alternative apparatus for generating a 4.21 MHz nervous carrier signal in the FIG. 1 recording circuitry in accordance with aspects of the invention.

FIG. 4 shows one way to generate the nervous 4.21 MHz frequency carrier signals without having to have another phase-locked loop in addition to the phase-locked loop PLL1 used in the write address generator 20 to generate nervous clocking signals. The write address counter 23 is shown in greater detail as comprising a four-stage binary counter 231 that counts 10.1 MHz oscillations supplied from the VCO 22 to its carry-in (CI) connection to generate a 629 kHz square wave at its carry-out (C0) connection, a six-stage binary counter 232 that counts that 629 kHz square wave supplied to its carry-in (CI) connection from the carry-out (C0) connection of four-stage binary counter 231, and a decoder 233 for responding to the combined counts of counters 231 and 232 to reset the combined counts to 00 0000 0000 after the combined counts reach 10 0111 1111.

The nervous clock generator 11 is shown in greater detail as comprising an amplifier 111 receiving as its input signal 629 kHz square wave from the carry-out (C0) connection of the counter 231, a crystal oscillator 112 for generating a very stable with time 3.58 MHz sine wave, a counter 113 for counting horizontal scan lines modulo-four, a programmable phase shifter 114 for shifting the 3.58 MHz sine wave in 90° steps in accordance with that modulo-four count, and an up-converting mixer 115 that generates the nervous 4.21 MHz frequency carrier signals responsive to the sum frequency of the phase-shifted 3.58 MHz sine-wave oscillations from phase shifter 114 and the amplified 629 kHz output signal of the amplifier 111, which latter signal is "nervous" by reason of the shortness of the time constant $\tau_1$ of the phase-locked loop PLL1.

The programmable phase shifter 114 is used because there is to be a 90° incremental shift of 4.21 MHz from one horizontal scan line to the next during video recording. This provides for the desired 90° incremental shift of the 629 kHz color-under carrier from one horizontal scan line to the next during video recording. By way of example the programmable phase shifter 114 can comprise a tapped analog delay line for supplying 0°, 90°, 180° and 270° phases of 3.58 MHz sine wave and a multiplexer for selecting, in accordance with each modulo-four count of scan lines, a corresponding one of the four phases of 3.58 MHz sine wave as the output signal of the programmable phase shifter.

Figure 5:
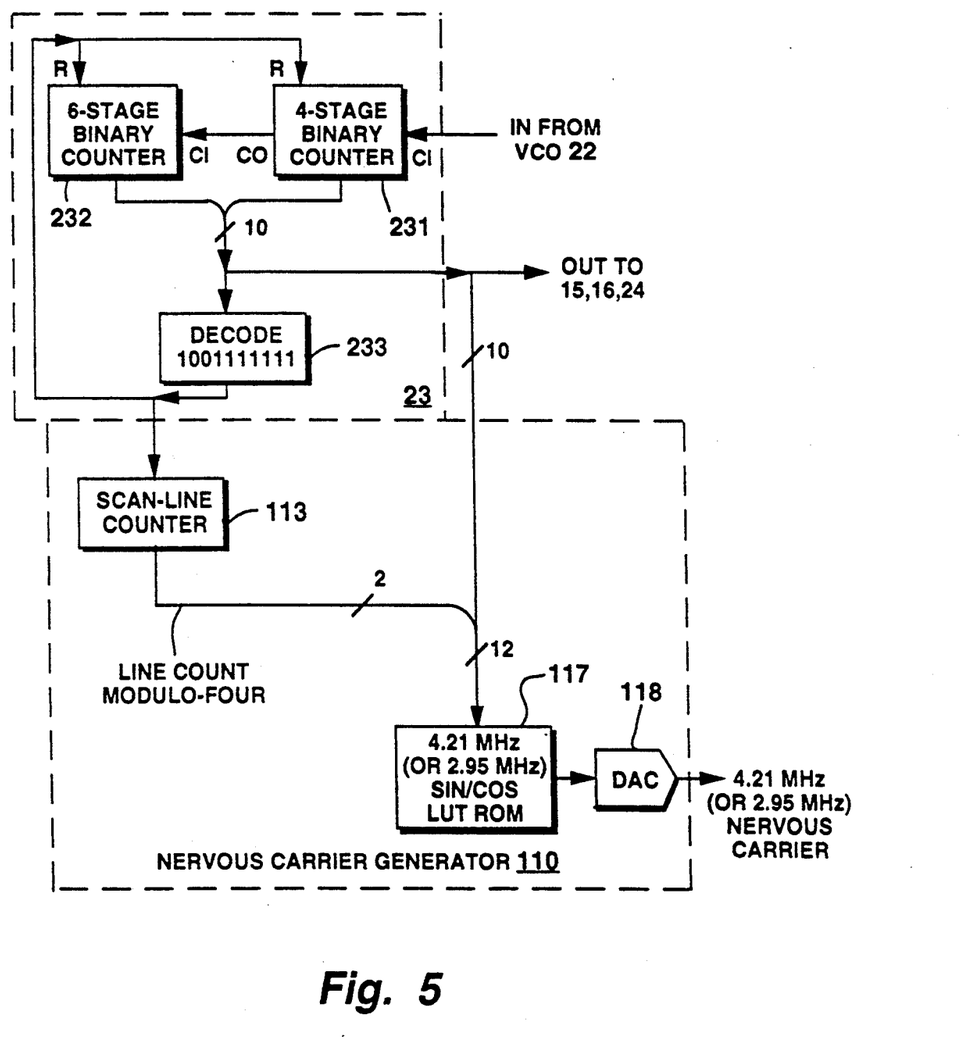

FIG. 5 shows another way to generate the nervous 4.21 MHz frequency carrier signals without having to have another phase-locked loop in addition to the phase-locked loop PLL1 in the write address generator 20. The nervous 4.21 MHz frequency carrier signals can be generated using a read-only memory 117 that stores sine-wave and cosine-wave look-up tables, a suitable one of which tables is selected for reading in accordance with the modulo-four count of horizontal scan lines. Since there is to be a 90° shift of 4.21 MHz from one horizontal scan line to the next during video recording, look-up from the sin/cos table is assumed to proceed on a four-scan-line cyclic basis. A digital-to-analog converter 118 converts the read-out signal from the ROM 117 to analog form for application to the down-converting mixer 12 of FIGS. 1 or 2.

One skilled in the art of ROM look-up tables will discern that, rather than using a ROM 117 that stores two full scan lines of 4.21 MHz sine-wave and cosine-wave, advantage can be taken of symmetries of these functions over the two scan lines and of the similarities between the functions except for shift in time base to reduce ROM storage requirements. The three more-significant bits of the 12-bit write address can be used to control modification of the nine less-significant bits of the 12-bit write address to generate addresses for a ROM, that stores half a scan line of the 4.21 MHz sin/cos function and to control selective negativing of the ROM frequency output signal, in order to generate correctly phased 4.21 MHz frequency carrier signals for each scan line. In the claims that are appended to this specification, such alternative arrangements are presumed to be within the scope of the term "read-only memory".

In FIGS. 4 and 5 the resets of the write-address counter 23 are shown being used as count input signal to the scan-line counter 113, which counter for the purposes of the invention needs only to be a two-stage binary counter for counting successive horizontal scan lines modulo-four. For other purposes, however, a multiple-stage binary counter 113 may be used for accumulating higher counts of successive scan lines or half-scan-lines, and two bits of the output signal of such a counter 113 may be used to provide the desired modulo-four count of scan lines used in FIG. 4 for controlling the programmable phase-shifter 114 and used in FIG. 5 for addressing the ROM storing the 4.21 MHz sin/cos look-up tables. Such a multiple-stage binary counter 113 should be of a type which counts horizontal scan lines over a two-frame cycle, so the counting of successive horizontal scan lines modulo-four progresses properly.

The FIG. 6 playback electronics receive a time-multiplexed L+ID signal recovered from the recording medium in accordance with prior art methods for recovering luma signals and a C+M color-under signal encoding chroma and motion signal C+M recovered from the recording medium in accordance with prior art methods for recovering color-under signals. The analog L+ID and C+M signals are digitized by a third analog-to-digital converter (ADC3) 513 and by a fourth analog-to-digital converter (ADC4) 514, respectively, which are similar in construction to the first analog-to-digital converter (ADC1)13 and to the second analog-to-digital converter (ADC2)14. The digitized L+ID signal is supplied to a third time-base corrector 515 (TBC3), which is similar in construction to the first time-base corrector 15 (TBC1). The digitized C+M signal is supplied to a fourth time-base corrector 516 (TBC4), which is similar in construction to the second time-base corrector 16 (TBC2). Accordingly, switching arrangements (not shown) can be provided for using elements 13-16 during playback as the elements 513-516, rather than using separate elements 513-516.

The luma reproducing circuitry comprises the third analog-to-digital converter 513 (ADC3), the third time-base corrector 515 (TBC3), a luma playback processor 540, an ID signal detector 550, and a multiplexer 551. Through appropriate switching arrangements (not shown), during playback the luma playback processor 540 can use elements which during recording are used in the luma recording processor 40. The ADC3 513 digitizes the reproduced luma and ID signal L+ID, and TBC3 515 performs TBE correction to the resulting digitized signal. The ID signal detector 550 identifies whether or not the luma signal of one field to be reproduced is a non-standard signal by detecting the recorded ID signal. If and only if the reproduced luma signal is a non-standard signal, the ID signal detector 550 generates a control signal that conditions the multiplexer 551 to apply arithmetic one (the presumed full value of the motion signal M) to the luma playback processor 540 for conditioning processor 540 to generate an output signal L just by spatial processing.

Luma playback processor 540 includes an unfolder 546 which restores the bandwidth compressed luma signal by frequency-folding into its original frequency bandwidth, a temporal filter 541 for eliminating a folding carrier and an undesired image sideband, a spatial filter 542, a noise canceler 543 which improves the image quality when reproducing signal recorded by a conventional VHS system, a soft switch 544, a motion factor generator 545, and a multiplexer 547. The multiplexer 547 reproduces as is its own output signal one of the output signals from soft switch 544 and noise canceler 543 supplied to the multiplexer 547 as its input signals, as selected by a mode select signal that specifies the kind of the video signal that is being played back from the tape, i.e., whether it is a normal VHS system or a bandwidth compression system. The motion factor generator 545 performs the same operation as the aforesaid motion factor generator 45 of the luma recording processor 400 in response to the input signal of the ID signal detector 550.

The chroma reproducing circuitry comprises the fourth analog-to-digital converter 514 (ADC4), the fourth time-base corrector 516 (TBC4), a motion/chroma separator 517, a digital-to-analog converter 518, a four-phase stable 4.21 MHz carrier generator 519 and an up-converter 520. The ADC4 514 digitizes the reproduced motion and chroma signal, and the TBC4 516 corrects the TBE during the reproduction of the digitized signal. The motion/chroma separator 517 separates the motion signal and the chroma signal, and supplies the motion signal to the 551 multiplexer for selective application to the motion factor generator 545. The separated chroma signal is converted to analog form by the digital-to-analog converter 518 for application as input signal to the up-converter 520, to be up-converted in frequency from 629 KHz to 3.58 MHz in accordance with a stable 4.21 MHz clock signal supplied by the 4.21 MHz carrier generator 519. The generator 519 supplies a four-phase 4.21 MHz stable clock with phase change from one horizontal scan line to the next during playback. These shifts of phase heterodyne with the phase shifts of the 629 kHz color-under carrier from one horizontal scan line to the next, as introduced during video recording, so these phase shifts cancel out in the regenerated 3.58 MHz chroma sidebands supplied from the up-converting mixer 520. Accordingly, the line-to-line changes in the carrier phasing of the regenerated 3.58 MHz chroma sidebands supplied from the mixer 520 replicate the line-to-line changes in the carrier phasing of the 3.58 MHz chroma sidebands in the composite signal originally supplied for recording.

The regenerated 3.58 MHz chroma sidebands supplied from the mixer 520 are additively combined with the luminance signal L supplied from the multiplexer 547 in circuitry subsequent to that shown in FIG. 6. There are customarily steps of filtering that precede this step of additive combining to regenerate a composite video signal. This composite video signal is rejoined with a modulated sound carrier and then used to modulate a low-level radio-frequency carrier. The modulated r-f carrier is suitable for application to a color television receiver.

Figure 7:
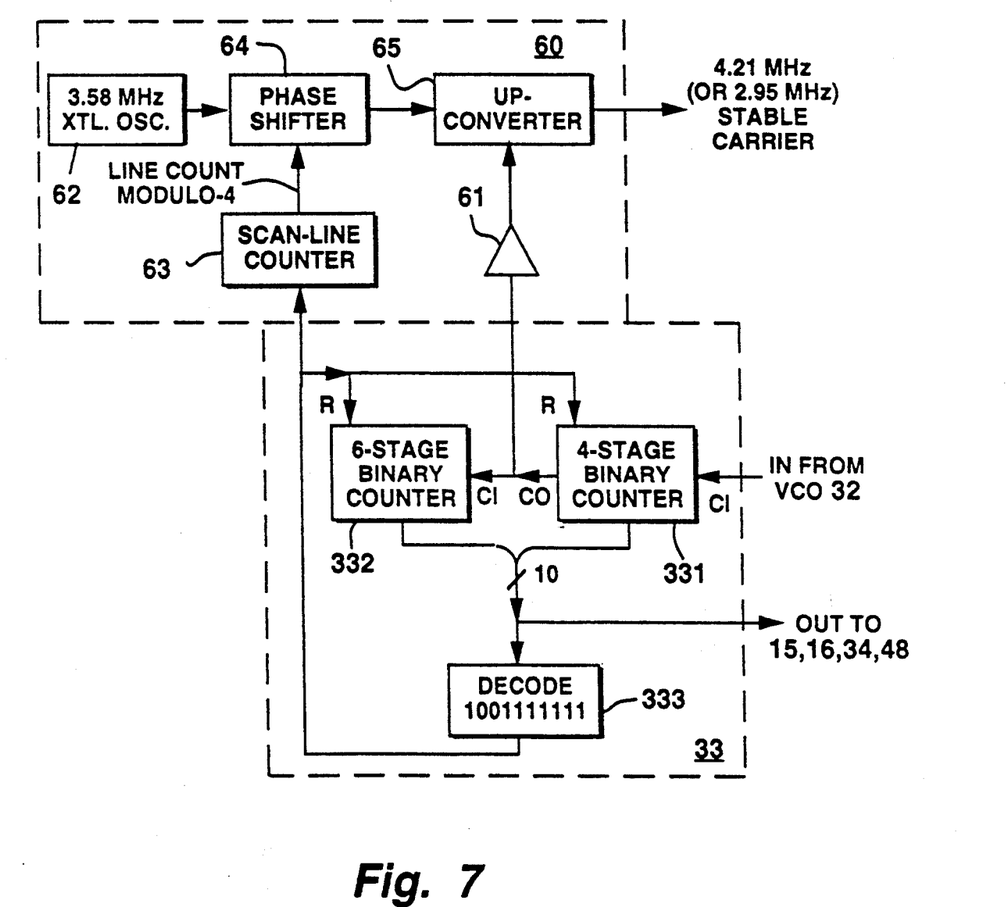
FIGS. 7, 8 and 9 are each a schematic diagram of an apparatus for generating a 4.21 MHz stable clock in the FIG. 6 playback circuitry.

FIG. 7 shows one form the stable 4.21 MHz frequency generator 519 of FIG. 6 may take, assuming that the time-base corrector TBC4 used during playback employs the same read address generator 30 used for time-base corrector TBC2 during recording. The read address generator 30 includes the read address counter 33. The read address counter 33 is shown in greater detail as comprising a four-stage binary counter 331 that counts 10.1 MHz oscillations supplied from the VCO 32 to its carry-in (CI) connection to generate a 629 kHz square wave at its carry-out (CO) connection, a six-stage binary counter 332 that counts that 629 kHz square wave supplied to its carry-in (CI) connection from the carry-out (CO) connection of four-stage binary counter 331, and a decoder 333 for responding to the combined counts of counters 331 and 332 to reset the combined counts to 00 0000 0000 after the combined counts reach 10 0111 1111.

The 4.21 MHz frequency stable carrier signal generator 60 is shown in greater detail as comprising an amplifier 61 receiving as its input signal 629 kHz square wave from the carry-out (CO) connection of the counter 331, a crystal oscillator 62 for generating a very stable with time 3.58 MHz sine wave, a counter 63 for counting horizontal scan lines modulo-four, a programmable phase shifter 64 for shifting the 3.58 MHz sine wave in 90° steps in accordance with that modulo-four count, and an up-converting mixer 65 that generates the stable 4.21 MHz frequency carrier signal responsive to the sum frequency of the phase-shifted 3.58 MHz sine-wave oscillations from phase shifter 64 and the amplified 629 kHz output signal of the amplifier 61, which latter signal is "stable" by reason of the length of the time constant $\tau_2$ of the phase-locked loop PLL2. The programmable phase shifter 64 is used to introduce the phase shifts of the 4.21 MHz frequency stable carrier signal from one horizontal scan line to the next during playback that heterodyne with the phase shifts of the 629 kHz color-under from one horizontal scan line to the next, as introduced during video recording, so these phase shifts compensate for each other in the up-converting mixer 520 output signal.

Figure 8:
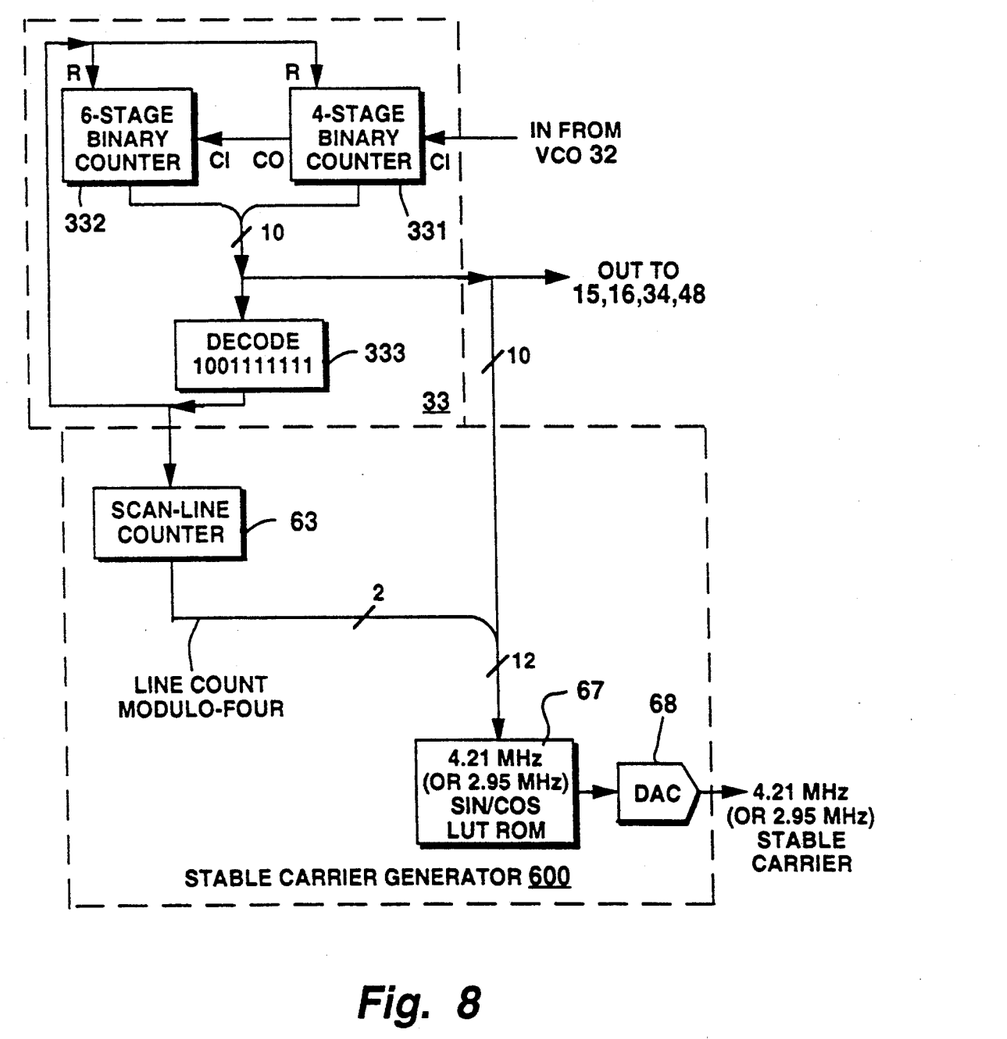

FIG. 8 shows another form the stable 4.21 MHz frequency generator 519 of FIG. 6 may take, again assuming that the time-base corrector TBC4 used during playback employs the same read address generator 30 used for time-base corrector TBC2 during recording. The read address counter 33 is assumed to have substantially the same structure as described in regard to FIG. 7. The scan-line counter 63 is assumed to have substantially the same structure as described in regard to FIG. 7, also. A read-only memory 67 stores sine-wave and cosine-wave look-up tables, and a digital-to-analog converter 68 converts the read-out signal from the ROM 67 to analog form for application to the up-converting mixer 520 of FIG. 6. The tables in ROM 67 are sequentially selected for reading, this selection being in accordance with the modulo-four count of horizontal scan lines supplied from the scan-line counter 63. This selection is such as to introduce phase shifts of the 4.21 MHz frequency stable carrier signal from one horizontal scan line to the next during playback that heterodyne with the phase shifts of the 629 kHz color-under from one horizontal scan line to the next, as introduced during video recording, so these phase shifts cancel out in the 3.58 MHz chroma sidebands supplied from the up-converting mixer 520.

Figure 9:
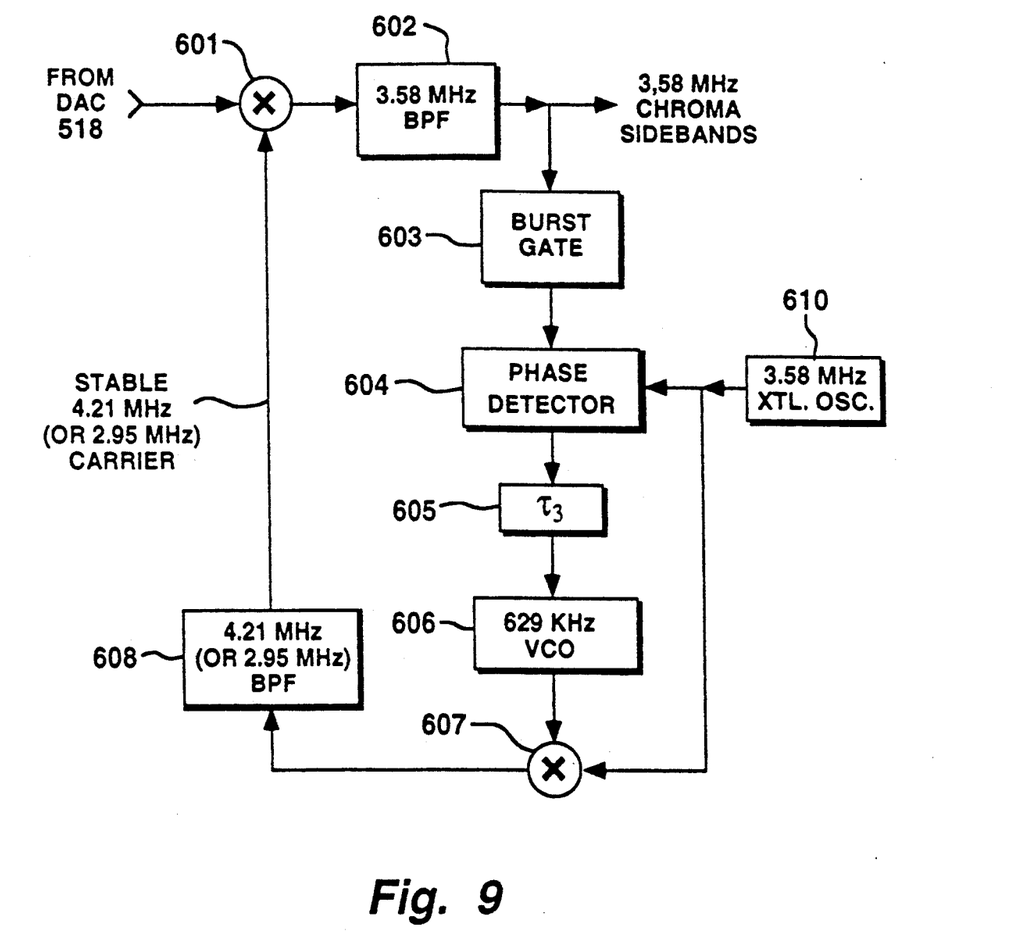

FIG. 9 shows still another form the stable 4.21 MHz frequency generator 519 of FIG. 6 may take, which form is similar to that used in prior-art VHS home video recorder playback electronics. While not as simple as the stable 4.21 MHz frequency generators of FIGS. 7 and 8, fast-forward, frame-freeze and other modes of trick play are better accommodated. The analog color-under signal from the digital-to-analog converter 518 and the four-phase 4.21 MHz stable carrier frequency being generated are heterodyned in a mixer 601. The resulting 3.58 MHz sidebands, with phasing suitable to a composite video signal, are separated by a band-pass filter 602 that suppresses the higher-in-frequency image signal. A burst gate 603 selects the color burst from the resulting 3.58 MHz sidebands to a synchronous phase-detector 604, which detects the error of the separated burst from the 3.58 MHz oscillations supplied from a crystal oscillator 610. (Because 3.58 MHz crystals are so widely used in color television receivers, they are relatively inexpensive and 3.58 MHz oscillations are commonly used as a time-base reference for the servomechanism that controls tape speed). The error signal is passed through a low-pass filter 605 with a time constant $\tau_3$ of the order of several pixel durations and is then applied as control signal to a voltage-controlled 629 kHz oscillator 606, which reproduces the four-phase carrier of the color-under signal. The four-phase 629 kHz oscillations supplied by the oscillator 606 and the single-phase 3.58 MHz oscillations from the crystal oscillator 610 are heterodyned in a mixer 607 to generate four-phase 2.95 MHz and 4.21 MHz carrier signals. A band-pass filter 608 selects the four-phase 4.21 MHz frequency as the 4.21 MHz frequency stable carrier signal for application to the mixer 601. The action of the degenerative feedback loop as formed by interconnecting elements 601–608 is such as to remove during playback, both from the 3.58 chroma sidebands and the accompanying color bursts, the line-to-line phase modulation added during video recording.

A number of variants in the design of the phase-locked loops are known to those skilled in the art of their design and may be employed in alternative embodiments of the invention. As an example, the address counter output is in effect a digitized sawtooth wave which may be latched responsive to a recurring edge of the horizontal synchronizing pulses to generate an error signal for the VCO having its oscillations counted by the address counter. As a further example, the foregoing type of phase-locked loop may be modified to use the digitized sawtooth wave from the address counter to address a read-only memory storing a steeper slope discriminator characteristic that is latched responsive to a recurring edge of the horizontal synchronizing pulses to generate an error signal for the VCO having its oscillations counted. As a still further example, the digital discriminator response may be converted to analog form and the horizontal synchronizing pulses may used to gate the analog discriminator response to generate an error signal for the VCO having its oscillations counted. Other variants in the design of the phase-locked loops are known.

The mixers 12 and 520 have each been shown as being the type in which the difference of the heterodyned signals is selected by the mixer output filtering to be the output signal of the mixer. Mixers of the type in which the sum of the heterodyned signals is selected by the mixer output filtering instead are used in other video recorder/playback systems embodying the precepts of the invention, the 4.21 MHz frequency carrier signals being replaced with 2.95 MHz carriers. This represents a further departure from the VHS standard, however.

Video tape recorders in which the generation of the color-under signals is carried out completely in the digital regime or substantially so may embody the invention in its broader aspects. While the TBC of separately recorded luma and chroma signals has been described with specific reference to the processing of folded-spectrum luma signals, the TBC of separately recorded luma and chroma signals has general application in video recorder/playback systems in which digital processing of the luma signal, or of the chroma signal, or of both the luma and the chroma signals is carried out and requires time-base stability.

What is claimed is:

1. A combination of electronic components for generating a color-under signal responsive to the chrominance information portion of a composite video signal, which video signal also includes horizontal synchronizing information, said chrominance information comprising modulation of a suppressed carrier, said combination comprising:

a separator for separating said horizontal synchronizing information from said composite video signal;
    means for separating the chrominance portion of said composite video signal;
    an analog to digital converter for sampling said composite video signal and digitizing samples resulting from said sampling;
    a down-converter for mixing said separated chrominance information with a nervous carrier signal thereby to generate said color-under signal;
    a controlled oscillator for generating a succession of pixel clock signals at a rate the frequency and phase of which are determined in accordance with an oscillator control signal, said rate being more than twice the highest frequency of said composite video signal and setting the rate of the sampling by said analog to digital converter;
    a counter for counting the number of pixel clock signals supplied by said controlled oscillator to generate a count therefrom, said counter including means for returning said count therefrom to an initial value thereof after counting the number of pixel clock signals occurring in four scan lines of said composite video signal;
    means, responding to the condition of said counter, for generating a feedback signal the frequency and phase of which are related to the frequency and phase of which are related to the frequency and phase of said pixel clock signal rate, as a submultiple of said rate;
    a discriminator for discriminating when said feedback signal differs in frequency or phase from the horizontal synchronizing information separated from said composite video signal, to develop an error signal;
    a low-pass filter responsive to said error signal, for generating said oscillator control signal, thereby to complete a phase-lock loop connection including said controlled oscillator, said counter, said frequency divider, said discriminator and said low-pass filter; and
    means responding to the condition of said counter for deriving said nervous carrier signal.

2. A combination as set forth in claim 1 wherein said means for generating said nervous carrier signal comprises:

table look-up circuitry, responding to the count from said counter supplied thereto as a table-look-up address signal, for generating successive digital samples of said nervous carrier signal;
    a digital-to-analog converter for converting said successive samples of said nervous carrier signal to a continuous analog form of said nervous carrier signal applied to said down-converter for mixing with said separated chrominance.

3. A combination as set forth in claim 2 wherein said table look-up circuitry comprises a read-only memory.

4. A combination as set forth in claim 2 wherein said table look-up circuitry consists of a read-only memory.

5. A combination as set forth in claim 2 wherein said continuous analog form of said nervous carrier signal applied to said down-converter is an analog sinusoidal signal that has a 4.21 MHz frequency.

6. A combination as set forth in claim 2 wherein said continuous analog form of said nervous carrier signal applied to said down-converter is an analog sinusoidal signal that has a 2.95 MHz frequency.

7. A combination as set forth in claim 1 wherein said means for generating said nervous carrier signal comprises:

an oscillator oscillating at the frequency of a suppressed carrier of the chrominance information portion of composite video signal;
    means for deriving a horizontal scan line count modulo four from the count of said counter;
    means controlled by said horizontal scan line count modulo four for supplying a corresponding one of four phases of oscillations drawn from said oscillator oscillating at the frequency of the suppressed carrier of the chrominance information portion of said composite video signal, which four phases successively differ by 90° as they are successively selected by incrementing horizontal scan line count modulo four to generate a mixing signal;
    means for generating a square wave at the frequency of the suppressed carrier; and
    an up-converter for mixing said square wave with said mixing signal, thereby to generate said nervous carrier signal.

8. A combination as set forth in claim 7 wherein said nervous carrier signal applied to said down-converter is an analog sinusoidal signal that has a 4.21 MHz frequency.

9. A combination as set forth in claim 7 wherein said nervous carrier signal applied to said down-converter is an analog sinusoidal signal that has a 2.95 MHz frequency.

10. A combination as set forth in claim 1, wherein said means for generating a feedback signal comprises:
  a decoder responding to the condition of said counter for deriving said feedback signal.

11. In a video recorder for recording image-descriptive signals derived from composite video signals which include horizontal synchronizing information, which video recorder is of the type separating chrominance components from the composite video signals for conversion to color-under signals, frequency modulating a luma carrier wave with the remaining components of the composite video signals, and combining the color-under signals with the frequency-modulated luma carrier to generate said image-descriptive signals; a combination comprising:
  a separator for separating the horizontal synchronizing information from the composite video signal being recorded;
  means for separating the chrominance information portion of the composite video signal being recorded;
  an analog to digital converter for sampling the composite video signal being recorded and digitizing samples resulting from said sampling;
  a down-converter for mixing said separated chrominance information with a nervous carrier signal thereby to generate a color-under signal;
  a controlled oscillator for generating a succession of pixel clock signals at a rate the frequency and phase of which are determined in accordance with an oscillator control signal, said rate being more than twice the highest frequency of said composite video signal and setting the rate of the sampling by said analog to digital converter;
  a counter for counting the number of pixel clock signals supplied by said controlled oscillator to generate a count therefrom, said counter including means for returning said count therefrom to an initial value thereof after counting the number of pixel clock signals occurring in four scan lines;
  means, responding to the condition of said counter, for generating a feedback signal the frequency and phase of which are related to the frequency and phase of said pixel clock signal rate, as a submultiple of said rate;
  a discriminator for discriminating when said feedback signal differs in frequency or phase from the horizontal synchronizing information separated from the composite video signal being recorded, to develop an error signal;
  a low-pass filter responsive to said error signal, for generating said oscillator control signal, thereby to complete a phase-lock loop connection including said controlled oscillator, said counter, said frequency divider, said discriminator and said low-pass filter; and
  means responding to the condition of said counter for deriving said nervous carrier signal.

12. A combination of electronic components for generating a color-under signal responsive to the chrominance information portion of a composite video signal, which video signal also includes horizontal synchronizing information, said chrominance information comprising modulation of a suppressed carrier, said combination comprising:
  a separator for separating said horizontal synchronizing information from said composite video signal;
  means for separating the chrominance information portion of said composite video signal;
  an analog to digital converter for sampling said composite video signal and digitizing samples resulting from said sampling;
  a down-converter for mixing said separating chrominance information with a nervous carrier signal thereby to generate said color-under signal;
  a controlled oscillator for generating a succession of pixel clock signals at a rate the frequency and phase of which are determined in accordance with an oscillator control signal, said rate being more than twice the highest frequency of said composite video signal and setting the rate of the sampling by said analog to digital converter;
  a counter for counting the number of pixel clock signals supplied by said controlled oscillator to generate a count therefrom, said counter including means for returning said count therefrom to an initial value thereof after counting the number of pixel clock signals occurring in four scan lines of said composite video signal, said counter including a first plurality of counter stages each having at different times first and second output states, said first plurality of counter stages together counting said pixel clock signals for generating a square wave at the frequency of the suppressed carrier, which square wave exhibits transitions between first and second output states, said counter including a second plurality of further counter stages each having at different times first and second output states, said second plurality of counter stages together counting transitions from said first to said second states in said square wave, said first and second pluralities of counter stages together generating a pixel count, said counter including means for resetting the counter stages in said first and second pluralities to their first output states when the number of pixels in a horizontal scan line have been counted, said counter including a third plurality of still further counter stages each having at different times first and second output states, said third plurality of counter stages together counting the number of times said means for resetting the counter stages in said first and second pluralities resets them to their first output states and supplying a horizontal scan line count modulo four;
  means, responding to the current output states of said counter, for generating a feedback signal, the frequency and phase of which said feedback signal are related to the frequency and phase of said pixel clock signal rate, as a submultiple of said rate;
  a discriminator for discriminating when said feedback signal differs in frequency or phase from the horizontal synchronizing information separated from said composite video signal, to develop and error signal;
  a low-pass filter responsive to said error signal, for generating said oscillator control signal, thereby to complete a phase-lock loop connection including said controlled oscillator, said counter, said frequency divider, said discriminator and said low-pass filter;

an oscillator oscillating at the frequency of the suppressed carrier of the chrominance information portion of said composite video signal;

means controlled by said horizontal scan line count modulo four for supplying a corresponding one of four phases of oscillations drawn from said oscillator oscillating at the frequency of the suppressed carrier of the chrominance information portion of said composite video signal, which four phases successively differ by 90° as they are successively selected by incrementing horizontal scan line count modulo four to generate a mixing signal; and an up-converter for mixing said square wave with said mixing signal, thereby to generate said nervous carrier signal.

* * * * *